United States Patent [19]
Park et al.

[11] Patent Number: 5,770,851
[45] Date of Patent: Jun. 23, 1998

[54] COMPACT OPTICAL LOGIC OPERATOR ARRAY

[75] Inventors: Hyo-Hoon Park, Daejeon; Kwang-Joon Kim, Yusong-ku; Kyung-Sook Hyun, Daejeon; O-Kyun Kwon, Daejeon; Seok-Ho Song, Daejeon; Byueng-Su Yoo, Daejeon; Hye-Yong Chu, Daejeon, all of Rep. of Korea

[73] Assignee: Electronics and Telecommunications Research Institute, Daejeon, Rep. of Korea

[21] Appl. No.: 713,535

[22] Filed: Sep. 13, 1996

[30]     Foreign Application Priority Data

Dec. 7, 1995 [KR] Rep. of Korea ...................... 95-47435
Dec. 18, 1995 [KR] Rep. of Korea ...................... 95-51484

[51] Int. Cl.$^6$ .................................................... H01J 40/14
[52] U.S. Cl. ........................................ 250/208.1; 250/551
[58] Field of Search ............................. 250/208.1, 208.2, 250/216, 551; 385/39, 33; 359/152, 173, 174, 179

[56]                References Cited

U.S. PATENT DOCUMENTS 5,352,886  10/1994  Kane ........................................ 250/216
5,500,523   3/1996  Hamanaka ............................... 250/216

OTHER PUBLICATIONS

McCormick et al, "Five–Stage Free–Space Optical Switching Network with Field–Effect Transistor Self–Electro–Optic–Effect–Device Smart–Pixel Arrays", Applied Optics, vol. 33, No. 8, Mar. 10, 1994, pp. 1601–1618.

Willner et al, "2–D WDM Optical Interconnections Using Multiple–Wavelength VCSEL's For Simultaneous and Reconfigurable Communication Among Many Planes", IEEE Photonics Technology Letters, vol.5, No. 7, Jul. 1993, pp. 838–841.

*Primary Examiner*—Que Le
*Attorney, Agent, or Firm*—Nixon & Vanderhye P.C.

[57]                ABSTRACT

An improved parallel optical logic operator provides a path for light to pass through substrates in which a light source and an optical logic device are arranged. An optical logic device operates by transmission of light forwarded to a predetermined direction. This increases integration efficiency of the system by eliminating optical parts for changing the light path. A unit chip includes a laser array for generating a predetermined light in accordance with an electrical signal for a logic process, a laser array substrate on which via holes are formed for passing light, a microlens array for converting the light beam emitted from each laser device of the laser array into a parallel light beam for passing through the via hole, and an optical logic circuit array formed with a combination of an S-SEED which performs a logic function by transmission of the light signal through an optical window in S-SEED. A plurality of unit chips are laminated so that the light emitted from the laser device of one of the unit chips passes through an optical logic circuit of a corresponding unit chip and can be made incident on the optical logic circuit in the next unit chip through a via hole.

14 Claims, 5 Drawing Sheets

COMPACT OPTICAL LOGIC OPERATOR ARRAY

BACKGROUND OF THE INVENTION

1. Field of the Invention

The present invention relates to a parallel optical logic operator, and in particular to an improved parallel optical logic operator which is capable of minimizing optical paths by vertically and densely arranging surface emitting laser arrays, optical logic device arrays, and microlens arrays.

2. Description of the Conventional Art

Generally, a parallel optical logic processing system requires integration of light sources, optical logic devices for performing an operation with the light, and other optical components for adjusting the light path.

Here, the components for adjusting the light path require a larger installation space compared to the space occupied by other light sources and logic components.

Meanwhile, a parallel optical switching system having an optical switching function of a light-based control, which system uses a self-electro-optic effect device array (a SEED array) for optical control, and uses an optical separator for change of an optical path, was introduced in the industry.

The above-mentioned optical switching system is well described in an article entitled "Five-stage free-space optical switching network with field-effect transistor self-electro-optic-effect-device smart-pixel arrays—Applied Optics, Vol. 33 March, 1994, pages 1601~1618".

As is well described therein, the disclosed SEED device is directed to optical bistability between two states of absorbing or reflecting an incident light beam in cooperation with an electrolight effect in an optical window of a quantum well structure. This SEED device is directed to accessing light using a signal control beam light and a signal beam light.

However, in the above-mentioned system, the construction for controlling two optical signals is complex, and the entire structure is bulky since such optical components as beam splitters and objective lenses are bulky, thus making the system inconveniently large.

SUMMARY OF THE INVENTION

Accordingly, it is an object of the present invention to provide a parallel optical logic operator which overcomes problems encountered in the conventional parallel optical logic operator.

It is another object of the present invention to provide an improved parallel optical logic operator which is capable of minimizing an optical path by vertically and densely arranging surface emitting laser arrays, optical logic device arrays, and micro lens arrays.

It is another object of the present invention to provide an improved parallel optical logic operator which is capable of providing a a light beam path through substrates in which light sources and optical logic devices are arranged, and using an optical logic device in which a light beam outgoes forward along a predetermined direction and, thus increasing the integration efficiency of the system by eliminating optical parts otherwise needed for changing the light path.

To achieve the above objects, in accordance with a first embodiment of the present invention there is provided a parallel optical logic operator, which includes a unit chip including: a laser array for generating a predetermined light in accordance with an electrical signal for a logic process; a laser array substrate on which via holes are formed beside the laser device in a matrix arrangement for passing through the light emitted from previous chip; a microlens array for converting the light beam emitted from each laser device into a parallel light beam to pass the light through the optical windows in next optical logic circuits; and an optical logic circuit array formed with a combination of an S-SEED (Symmetric-SEED) which performs a logic function by transmission of the light through an optical window of S-SEED; wherein a plurality of said unit chip are laminated so that the light emitted by the laser device of one of the unit chips passes through an optical logic circuit of a corresponding unit chip and can made incident on next logic circuit through via hole of the next unit chip.

To achieve the above objects, in accordance with a first embodiment of the present invention there is provided a parallel optical logic operator, which includes a unit chip including: a semiconductor laser array formed on a substrate for passing through an optical signal beam; a microlens array converting the light emitted by each laser device of the semiconductor laser array into a parallel light in cooperation with the microlens; and an optical logic circuit array formed with a combination of an S-SEED which performs a logic function by receiving the light from the laser array through the optical windows; wherein a plurality of said unit chips are repeatedly arranged so that the light passed through an optical logic circuit of the unit chip can be made incident on next logic circuit of the next unit chip, thus performing a logic function one-by-one in a predetermined direction in order for the light to be vertical with respect to each substrate.

Additional advantages, objects and other features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

The parallel optical logic operator according to a first embodiment of the present invention will now be explained with reference to the accompanying drawings.

Figure 1:
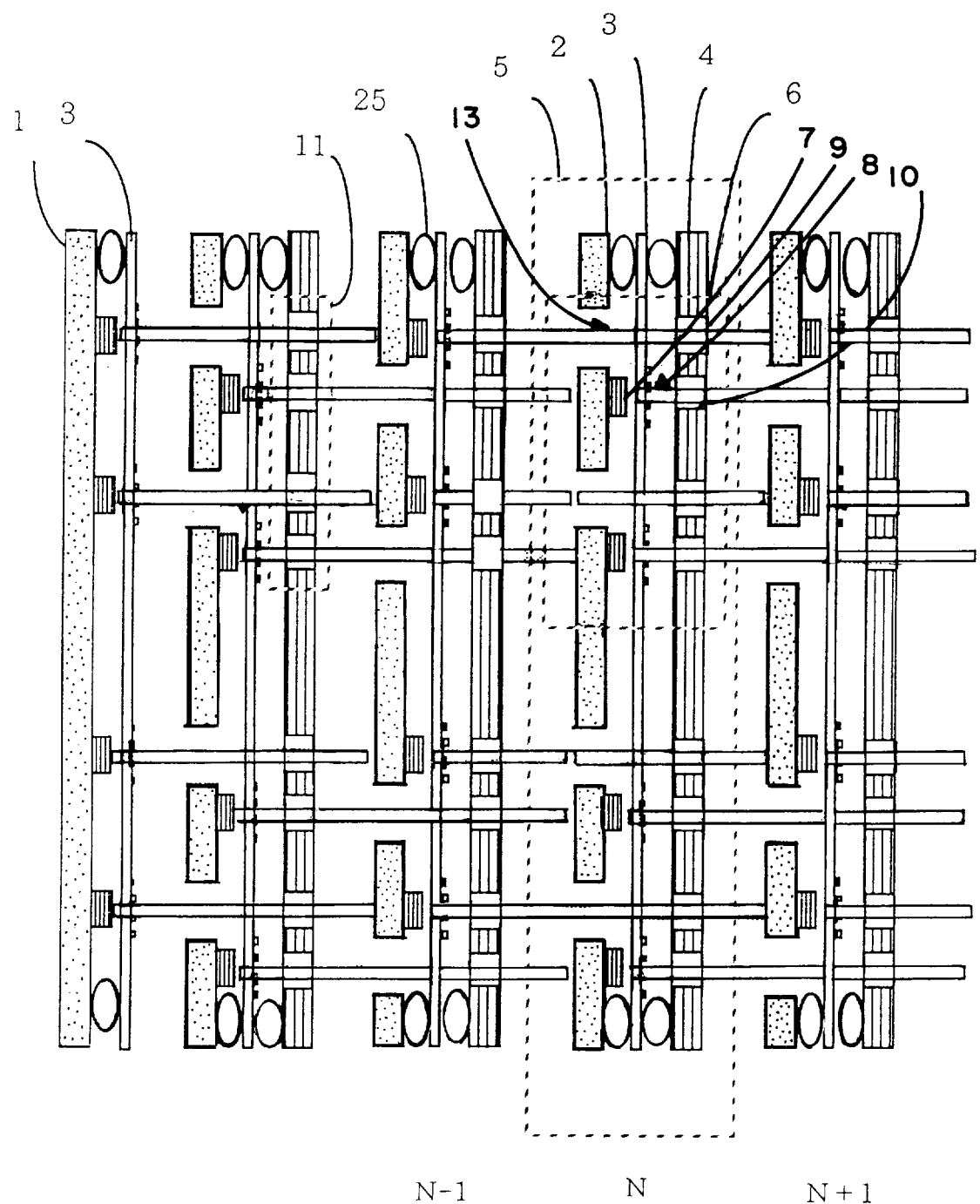
FIG. 1 is a cross-sectional view showing the entire construction of a parallel optical logic processing system according to an embodiment of the present invention.

FIG. 1 shows the entire construction of a parallel optical logic processing system according to an embodiment of the present invention.

As shown therein, the parallel optical logic processing system includes a unit chip 5 having a laser array 2, a microlens array 3, and an optical logic circuit array 4.

Beside the laser diode 2, a via hole 13 is formed in a substrate, and vertical-cavity surface emitting semiconductor laser 7 is formed on the substrate in a matrix form.

In the microlens array 3, a microlens 8 is formed by etching circular grids on a glass substrate using the Freznel lens principle. The microlens 8 serves to transmit the light emitted by the laser array through the optical windows of the optical logic circuit device.

The optical logic circuit array 4 is formed with a combination of an S-SEED which performs a logic function by transmission of an input light signal into the imput window 9 and writes an output signal in the output window 10.

This structure is well adaptable when the light absorption substantially occurs using the light having a shorter wave length than that corresponding to the band gap of a semiconductor substrate which is used in the laser array 2.

In the system according to the present invention, as the laser device 7, a vertical-cavity surface emitting laser array is used. In addition, as an optical logic device, a SEED array is used. Here, the SEED is classified into a reflection type and a transmission type. In the present invention, the transmission type SEED is used for maintaining propagation of light to a predetermined direction.

In the present invention, a microlens array 3 is used as a member for decreasing the dispersion of the light in its outgoing direction. The microlens 8 uses a micro Freznel lens 8 of a transmission type, which micro Freznel lens 8 is formed on the glass substrate.

In this embodiment, the array means two-dimensional arrangement of the laser devices, the optical logic devices, or the microlens on a flat surface in an M×N. dimension.

The configuration of each array part is shown in FIG. 1. The basic configuration is shown in FIG. 1 as an N-th unit chip 5 which is indicated by the doted line. As shown therein, the surface emitting laser array 2 having an optical via hole, the microlens array 3, and the optical transmission logic circuit array 4 are arranged in order.

The above-described three arrays are combined, and forms a unit chip 5 which performs a specific logic function. An operation process with respect to various logic functions is performed by repeatedly combining the unit chip 5.

Meanwhile, the laser array 1 and the microlens array 3 without the via hole as an initial data input are arranged in front of the first unit chip as shown in FIG. 1.

The variation of the logic function in each of the unit chips N−1, N, and N+1 is caused by varying the internal circuit of the optical logic circuit array 4. Each logic circuit is formed by arranging circuits having AND, OR, NOR, and NAND features using the S-SEED device.

Figure 2:
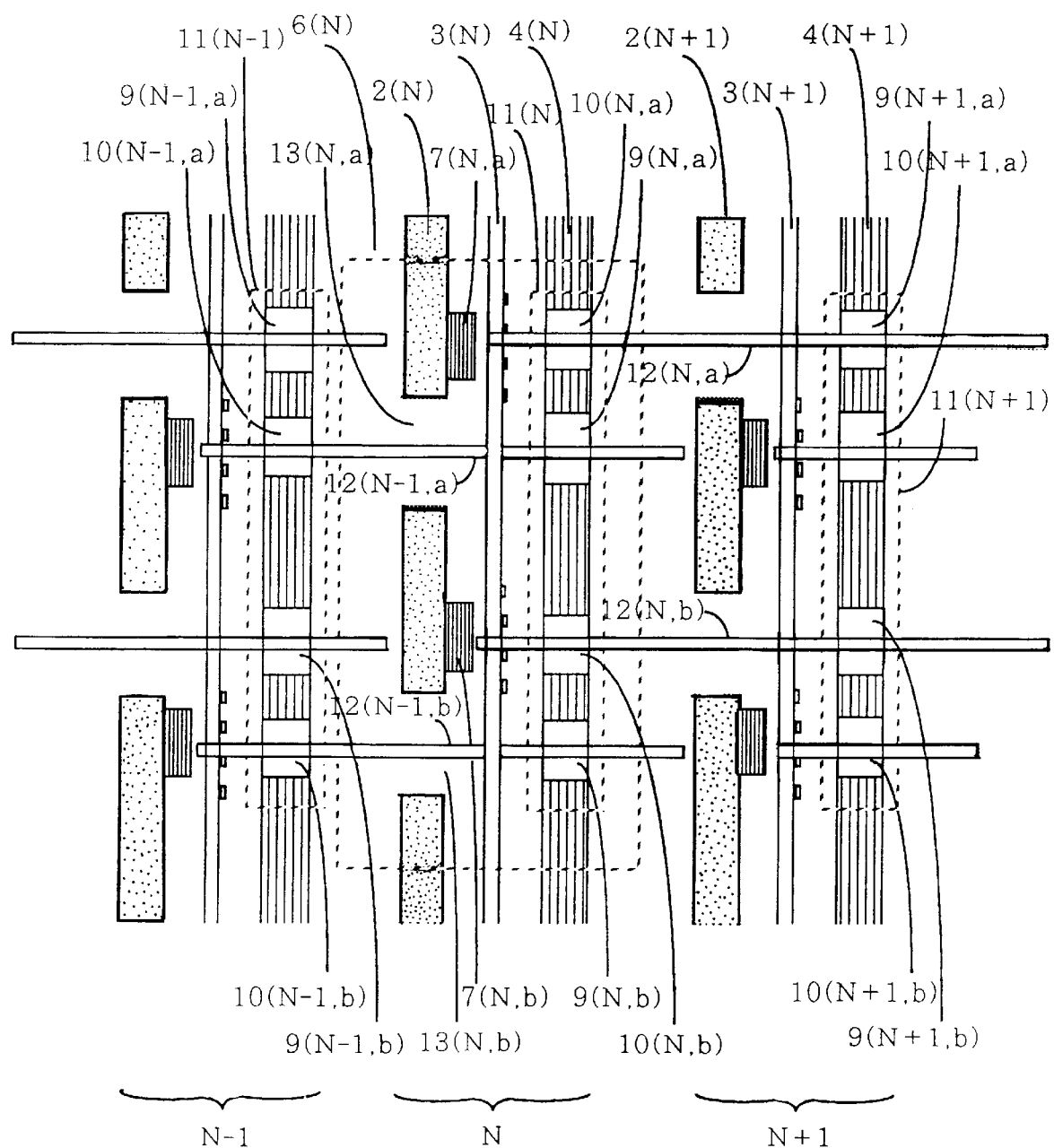
FIG. 2 is a detailed cross-sectional view showing the construction of a unit chip of a parallel optical logic processing system according to the present invention.

In the transmission S-SEED circuit, a data is inputted by transmitting a pair of light beams into a pair of optical input windows. The output data resulted from a logic operation in the logic circuit is stored in a pair of optical output windows. The stored data is read by transmission of a pair of other light beams through the output windows in the same direction. Namely, a pair of laser rays are binary-processed in a basic unit. In FIGS. 1 and 2, reference numeral 6 denotes a basic unit for an operation process.

The detailed structure of array parts in the unit chip 5 will now be explained with reference to FIG. 2 which shows an N-th logic unit.

Via holes 13(N, a) and 13(N, b) are formed in the laser array substrate 2 in the N-th unit chip 5 in order for laser beams 12(N−1, a) and 12(N−1, b) emitted in the N−1 unit chip to pass therethrough.

Figure 3:
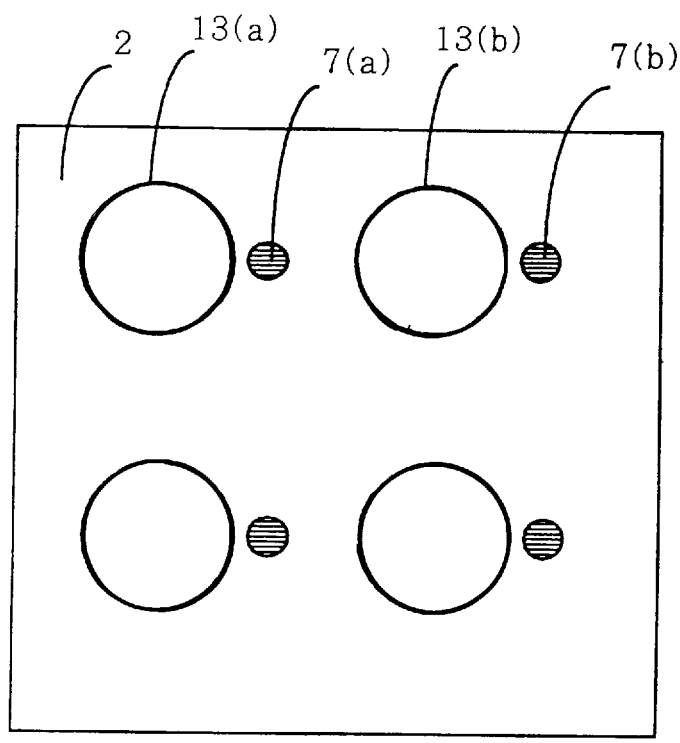
FIG. 3 is a plan view of a two-dimensional array of a laser according to the present invention.

The arrangement of the via hole 13 is shown in FIG. 3. As shown therein, the via holes 13a and 13b are formed beside each laser device for example 7a and 7b. The laser device 7 may be adapted by either a top-emitting type in which the light is emitted toward front side of the substrate and a bottom-emitting type in which the light is emitted toward back side of the rear of the substrate.

Each substrate of the laser array 2, the microlens array 3, and the optical logic circuit array 4 is affixed in a flip chip junction method using metal contact. The focus of the microlens is made parallel with the light emitted from the laser device, for example 7(N, a), and the light is made incident into two sequential logic device windows 9(N, a) and 10(N+1,a) in two unit chips which are N-th and (N+1)th.

As shown in FIG. 1, the logic operation process of the optical logic processing system will now be explained as follows.

Figure 4A:
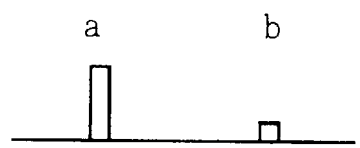
FIGS. 4A through 4C are views showing a signal processing for a logic function according to the present invention.
Figure 4B:

An optical signal system will now be explained:

An optical signal of a binary method of 0 or 1 which are necessary for an optical logic operation is implemented using a pair of laser beams "a" and "b". For example, as shown in FIG. 4A, between the pair of the laser beams "a" and "b", the level of the signal is set as 0 in a state that the intensity of the beam "a" is stronger, and the intensity of the beam "b" is weaker. On the contrary, as shown in FIG. 4B, the level of the signal is set as 1 in a state that the intensity of "a" is weaker, and the intensity of "b" is stronger. Here, the intensity of two lights is within a predetermined range in which the light is absorbed by the SEED optical windows 9 and 10 in th optical logic circuit 11 and is converted into the optical bistability state.

An optical signal input will now be explained.

As shown in FIG. 1, a pair of lights having a predetermined signal of FIGS. 4A or 4B is emitted in cooperation with a pair of lasers of the initial laser array 1, and a data is inputted to the input-window 9 of the optical logic circuit 11 in the next unit chip.

The next optical signal input will be explained with reference to an N-th logic operation unit 6(N) as shown in FIG. 1. The optical signals 12(N−1, a) and 12(N−1, b) transmitted from the (N−1)th output windows 10(N−1, a) and 10 (N−1, b) of the (N−1)th optical logic circuit 11(N−1) are inputted into the N-th input windows 9(N, a) and 9(N, b) of the N-th optical logic circuit 11(N) through the via holes 13(N−1, a) and 13(N−1, b) of the Nth laser array.

The light passed through the N-th input windows 9(N,a) and 9(N,b) of the N-th optical logic circuit 11(N) is made incident on the (N+1)th laser array substrate 2(N+1) and disappears therein. Here, the disappearance of laser beams 12(N−1, a) and 12(N−1, b) occurs by the absorption of the light on the backside of the laser array substrate 2(N+1).

A logic operation will now be explained.

The logic operation is performed by the N-th S-SEED devices including the optical windows 9(N, a),9(N, b) and 10(N, a), 10(N, b). The optical signals 12(N−1, a) and 12(N−1, b) transmitted from the (N−1)th optical windows 10(N−1, a) and 10(N−1, b) are inputted in the N-th optical input windows 9(N,a) and 9(N,b) in the N-th logic circuit 11(N). As a result of the logic operation, the data is stored in a state that the data can serve in order for the N-th optical output windows 10(N, a) and 10(N, b) to absorb light or to pass the same. Here, an OFF state means that the light can be absorbed, and an ON state means that the light can be passed through.

Next, an optical signal output operation will now be explained.

Figure 4C:
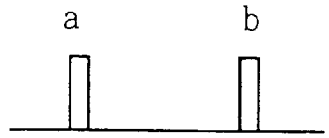

The beams having a high intensity and emitted from a pair of lasers 7(N, a) and 7(N, b) in the N-th logic operation unit, as shown in FIG. 4C, are oscillated and pass through the N-th optical logic output windows 10(N, a) and 10(N, b) and read the stored data. When one of the output windows 10(N, a) or 10(N, b) of the N-th optical logic circuit 11(N) is in an ON state, the intensity of the light passed through the windows is identical, and the optical signal corresponding to a high intensity as shown in FIGS. 4A and 4B is outputted. When the light passes through the OFF state window, most of the light is absorbed, and the optical signal having a lower intensity is outputted as shown in FIGS. 4A and 4B. Here, the output optical signals 12(N, a) and 12(N, b) are inputted again to the (N+1) optical logic input windows 9(N+1, a) and 9(N+1, b) in the (N+1)th logic circuit 11(N+1). Here, since the time when a data is stored in the S-SEED optical logic circuit windows 9 is limited at a very short time of $10^{-9}$ second, a predetermined time difference corresponding thereto is necessary for the input/output of the data. Namely, after performing the logic operation by the N-th optical logic circuit, when an ON or OFF state data is stored in the windows 10(N, a) and 10(N, b), a light is emitted from the N-th lasers 7(N, a) and 7(N, b) with a time difference in which the data disappears, and then the stored data is read.

Figure 5:
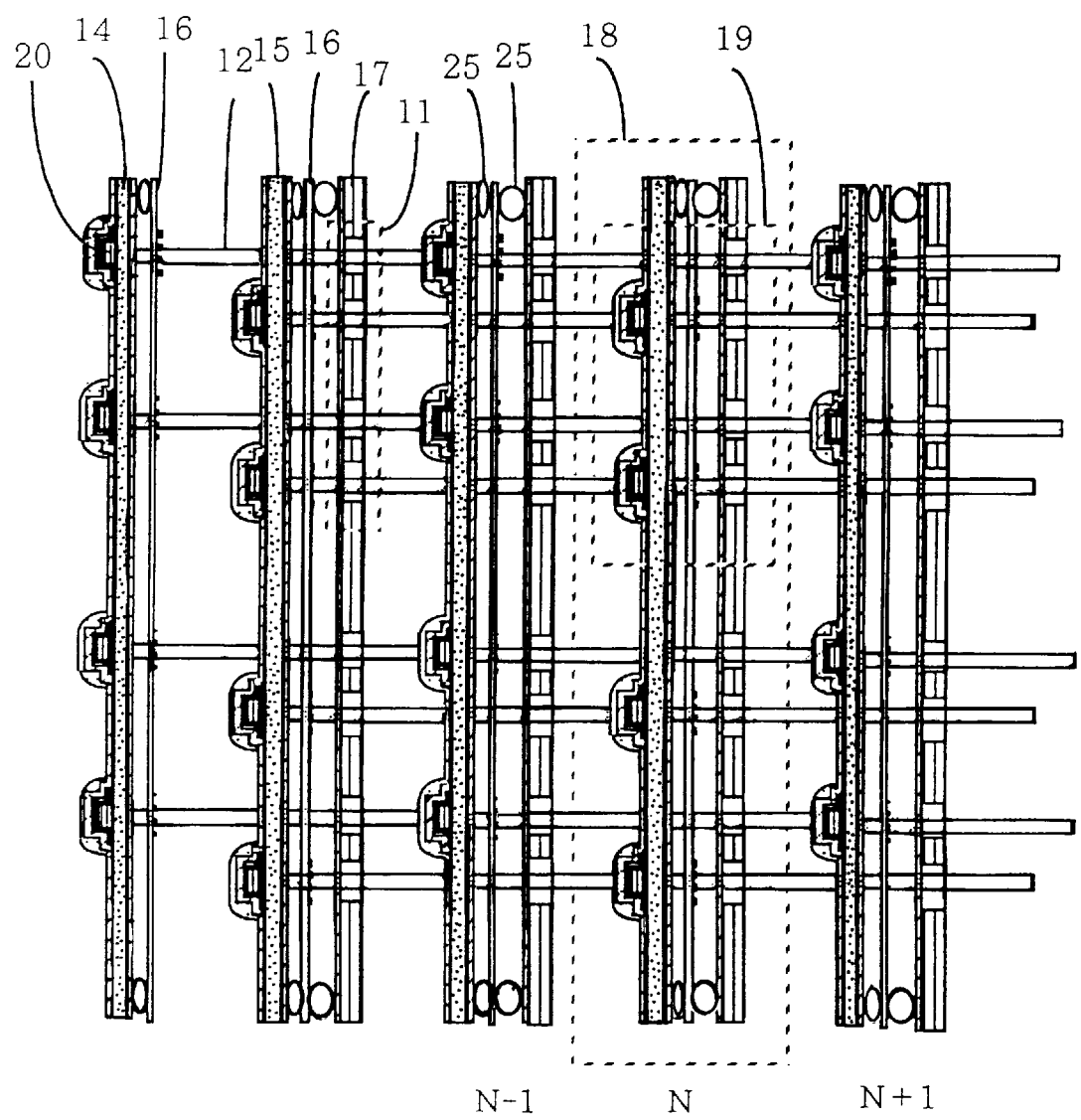
FIG. 5 is a cross-sectional view showing the entire construction of a parallel optical logic processing system according to another embodiment of the present invention.

FIG. 5 is a cross-sectional view showing the entire construction of a parallel optical logic processing system according to another embodiment of the present invention. In addition, FIG. 6 is a cross-sectional view showing the construction of a logic operation unit 19 in a unit chip 18 of FIG. 5 according to the present invention.

As shown therein, this embodiment of the present invention is adaptable in case that the absorption of the beam in the substrate can be neglected by using an optical signal having a wavelength longer than the bandgap of the semiconductor which is used as a laser array substrate.

As shown in FIG. 5, the arrangement order of a laser array 15, a microlens array 16, a logic circuit array 17, and an initial input laser array 14 are the same as the first arrangement of FIG. 1. However, this embodiment adopts a surface emitting laser array 16, which provides a path for the light beam by transmission through the laser array substrate, not through the via hole as the first embodiment shown in FIG. 1.

Figure 6:
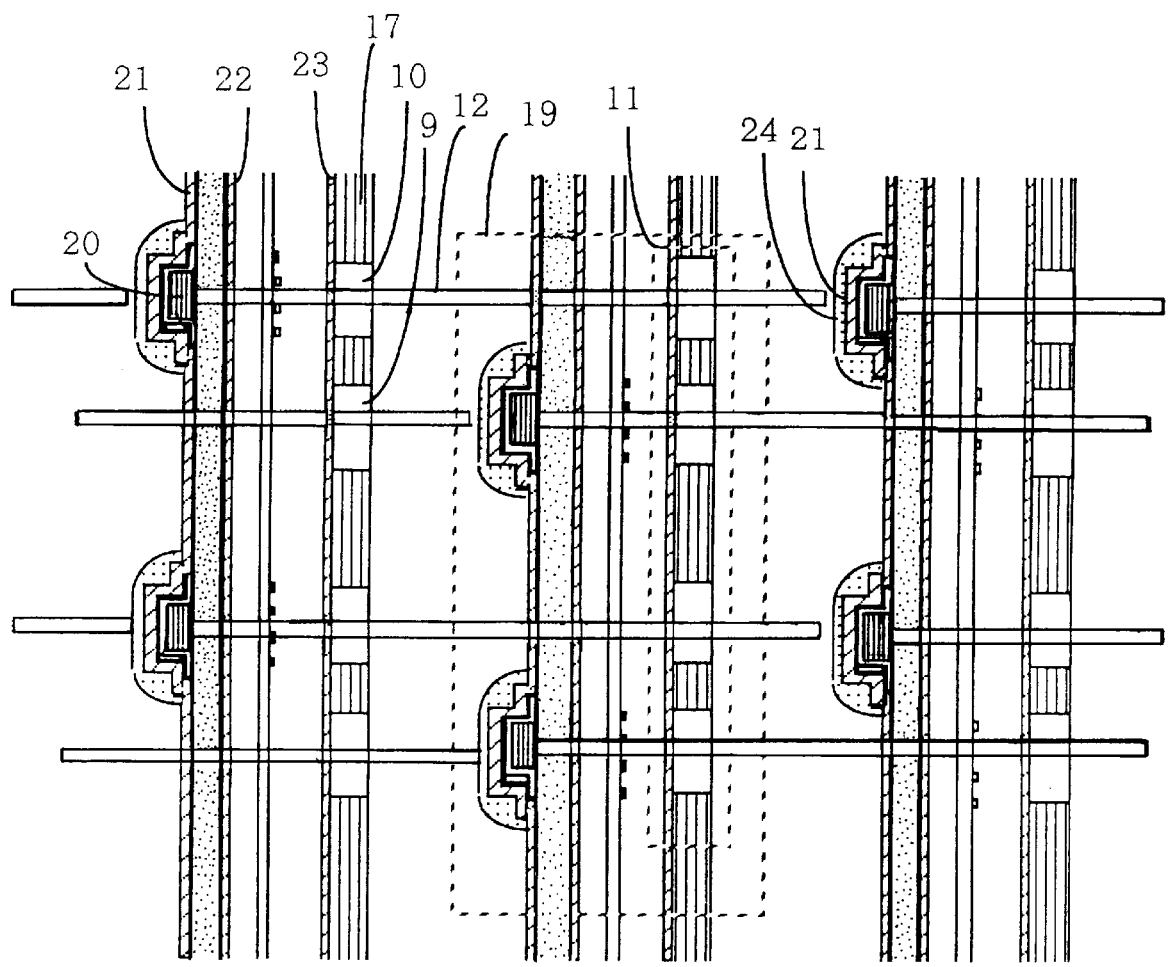
FIG. 6 is a cross-sectional view showing the construction of a unit chip of FIG. 5 according to the present invention.

The detailed structure of array compartments of a unit chip 18 is shown in FIG. 6. A bottom surface emitting laser 20 is used for the surface emitting laser array 15 wherein the light is transmitted to the back side of the substrate. Anti-reflection films 21 and 22 are coated on the entire surface of the substrate using dielectric materials. An anti-reflection film 23 is coated on the entire surface of the substrate of the logic circuit array 17 using dielectric materials. A polyamide film 24 which absorbs the light is coated at the portion of the back side of N-th laser substrate on which the light transmitted from the front surface of the (N−2)th laser is made incident, so that the beam which finished the logic operation can disappear.

The logic operation process of the second structure of FIG. 5 is the same with the first structure of FIG. 1.

The effect of the parallel optical logic operator according to the present invention will now be explained.

First, it is possible to resolve the problems of the loss of light and the obstacle of incident light using a via hole formed in the laser array substrate of the first structure. In particular, in case of using the wavelength of a laser beam which is absorbed by the substrate, the via hole may be used as the path of the light.

Second, since a wider area of the transmission laser array substrate of the second structure is available for passing through light, it is easy to align the path of the light between unit chips.

Third, since a light transmitted from each logic operation step outgoes straight forward, any optical part is not required for changing the path of the light.

Fourth, since array parts can be densely laminated on the flat surface of the device, an integration efficiency is significantly increased, and it is possible to achieve a large capacity parallel signal process system.

Although the preferred embodiments of the present invention have been disclosed for illustrative purposes, those skilled in the art will appreciate that various modifications, additions and substitutions are possible, without departing from the scope and spirit of the invention as described in the accompanying claims.

What is claimed is:

1. A parallel optical logic array comprising:
    a plurality of unit chips each unit chip including:
        a laser array for generating predetermined light signals in accordance with input electrical signals for a logic process;
        a laser array substrate on which said laser array is mounted and in which via holes are formed for passing through light signals input from an adjacent unit chip;
        a microlens array (a) for forming light beams respectively emitted from laser devices of the laser array into parallel light beams and (b) for passing light beams coming from another unit chip through said via holes onto optical windows of an adjacent optical logic circuit;
    said adjacent optical logic circuit array including an S-SEED for performing a logic function by transmission of a light signal through an optical input window of an S-SEED circuit and for providing logical output data in an optical output window of an S-SEED circuit;
    wherein a plurality of said unit chips are laminated together in successive adjacent disposition so that light emitted by a laser device of one of the unit chips passes through an aligned optical output window of an optical logic circuit in unit chip and can be made incident to input data on an aligned optical output window of an optical logic circuit in another unit chip through one of its via holes.

2. A parallel optical logic array as in claim 1 wherein said laser devices of the laser array are top-emitting type vertical cavity surface emitting laser devices.

3. A parallel optical logic array as in claim 1 wherein said via holes are formed beside the laser devices in a matrix arrangement.

4. A parallel optical logic array as in claim 1 wherein each microlens of the microlens array is formed by etching a circular grid on a glass substrate in accordance with a Freznel lens principle.

5. A parallel optical logic array as in claim 1 wherein a microlens array and a laser array are bonded together in front of an initial unit chip so as to input a source optical signal which passes through via holes of the initial unit chip.

6. A parallel optical logic array as in claim 1 wherein each logic circuit of the logic circuit array is formed to provide a binary logic operation using two laser beams as a basic unit.

7. A parallel optical logic array as in claim 6 wherein said laser devices of the semiconductor laser array are bottom-emitting type vertical cavity surface emitting laser devices.

8. A parallel optical logic array as in claim 6 wherein each optical logic circuit performs a binary logic operation using two laser beams as a basic unit.

9. A parallel optical logic array as in claim 6 wherein said laser array substrate is an optical transmission substrate on which anti-reflection films of dielectric materials are coated on both sides of the substrate.

10. A parallel optical logic array as in claim 6 wherein the entire surface of each laser device of the laser array is coated with a light absorption film.

11. A parallel optical logic array as in claim 8 wherein said optical transmission substrate is formed of a light absorption film which is made of a polyamide material.

12. A parallel optical logic array comprising:
   a plurality of unit chips, each unit chip including:
      a semiconductor laser array formed on a substrate through which light signals are transmitted;
      a microlens array forming light beams respectively emitted from laser devices of the laser array into parallel lightbeams; and
      an optical logic circuit array including an S-SEED which performs a logic function on input light signals received through an optical input window of the S-SEED circuit and provides logic output data in an optical output window of the S-SEED circuit;
   wherein a plurality of said unit chips are sequentially arranged so that light can be passed therethrough onto an optical input window of an optical logic circuit of a unit chip and can be made incident onto an optical output window of an optical logic circuit in another downstream unit chip, thus performing a logic function by propagation of light signals toward a predetermined direction which is normal with respect to each substrate.

13. A parallel optical signal logic array unit chip comprising:
   a laser array disposed on a substrate also having via holes offset from lasers of the laser array for passing input light signals therethrough;
   a microlens array disposed on an adjacently disposed substrate having a microlens disposed in the respective paths of laser light signals output from at least some of said lasers; and
   a light signal logic array disposed adjacent said microlens array having light signal input ports respectively aligned with at least some of said lasers and with at least some of said via holes.

14. A parallel optical signal logic array comprising a plurality of unit chips as in claim 13, said plural unit chips being disposed adjacent to one another with at least one optical output signal port from one chip being aligned with a respectively corresponding via hole of at least one other unit chip.

* * * * *